Nov. 8, 1955  D. A. MEEKER ET AL  2,723,113
SCALE

Filed May 11, 1949  8 Sheets-Sheet 1

INVENTORS
David A. Meeker
John M. Sherman
BY Marechal & Biebel
ATTORNEYS

Nov. 8, 1955  D. A. MEEKER ET AL  2,723,113
SCALE
Filed May 11, 1949  8 Sheets-Sheet 2
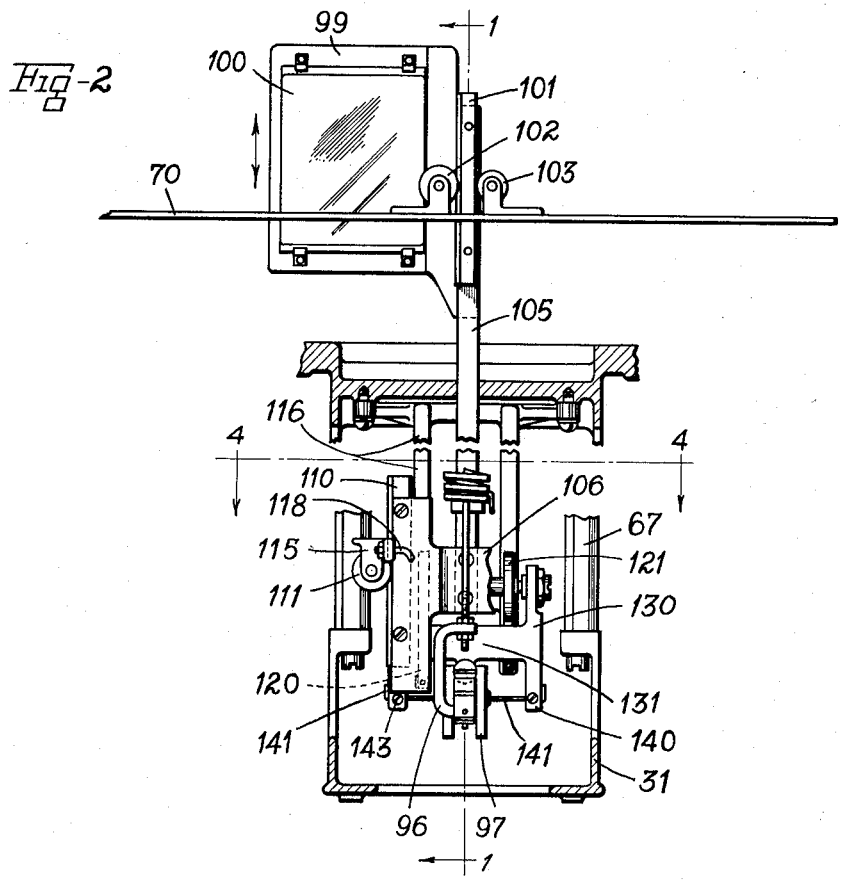
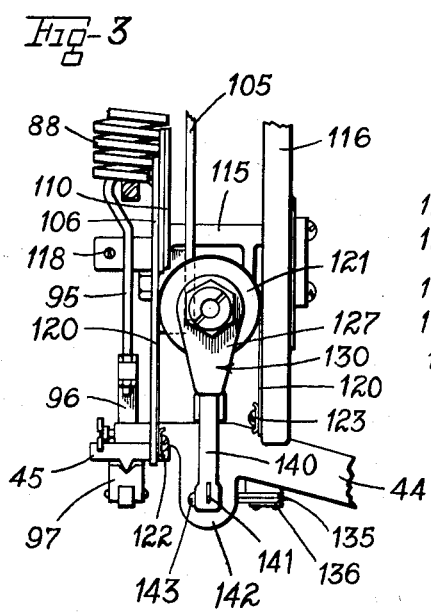
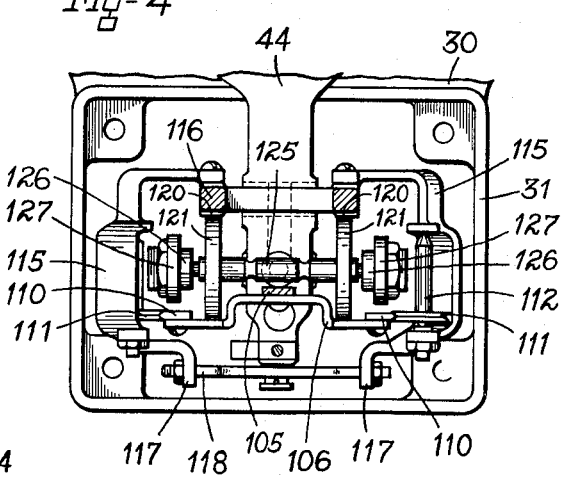
INVENTORS
David A. Meeker
BY John M. Sherman
Marechal & Biebel
ATTORNEYS Nov. 8, 1955 D. A. MEEKER ET AL 2,723,113
SCALE
Filed May 11, 1949 8 Sheets-Sheet 3
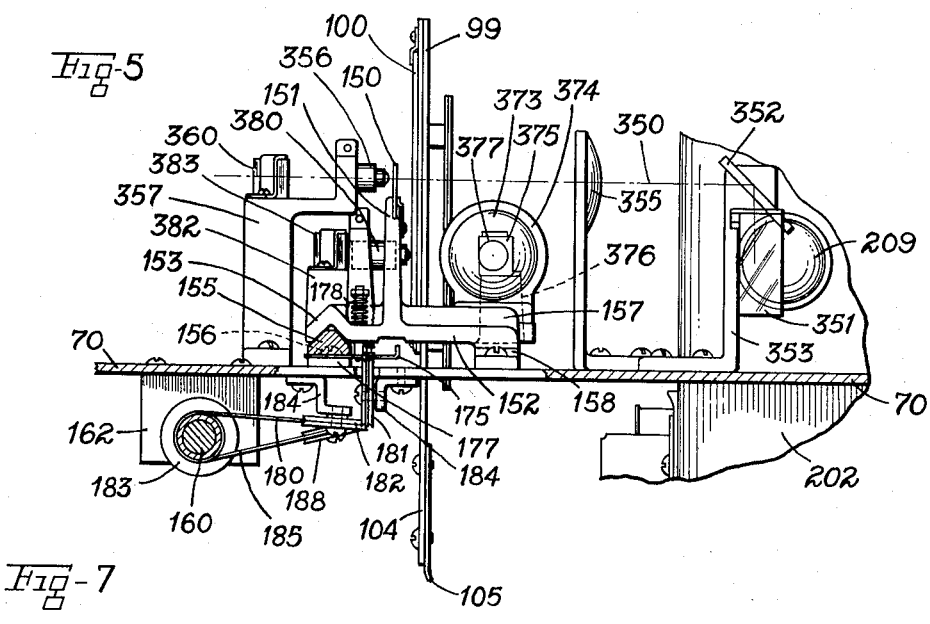
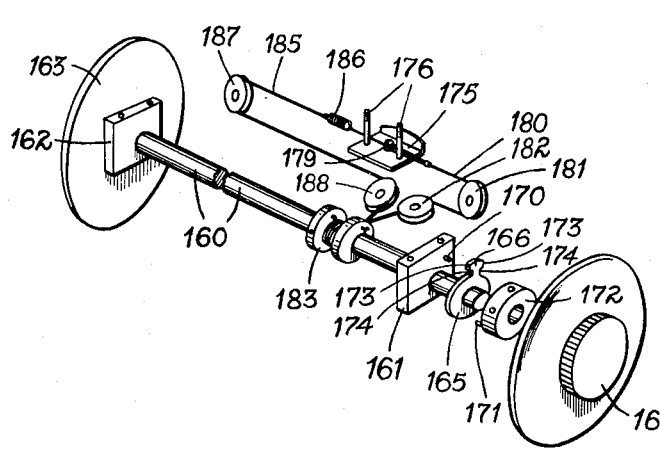
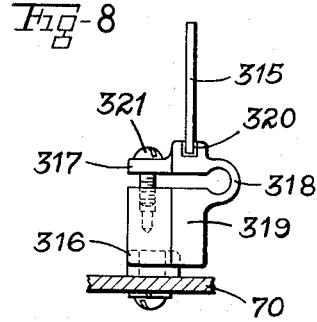
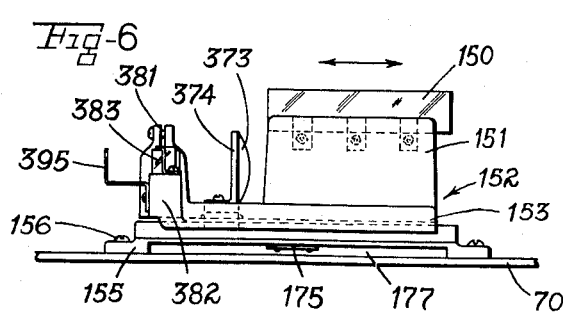
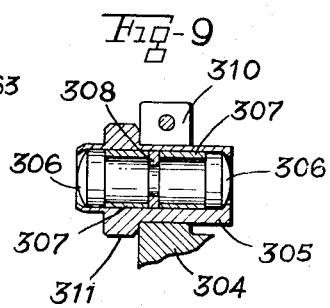
INVENTORS
David A. Meeker
BY John M. Sharman
Marechal & Biebel
ATTORNEYS

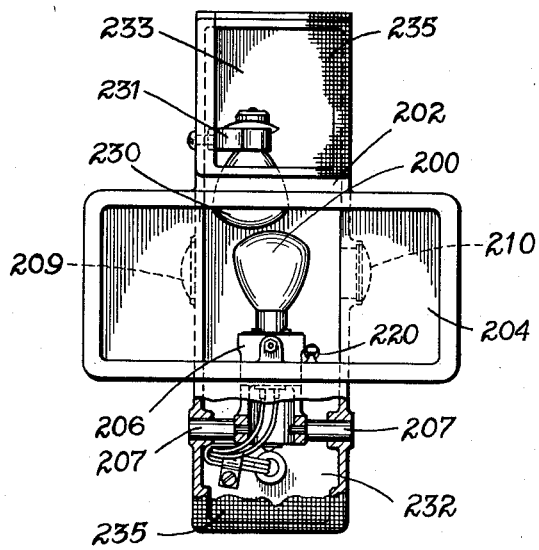
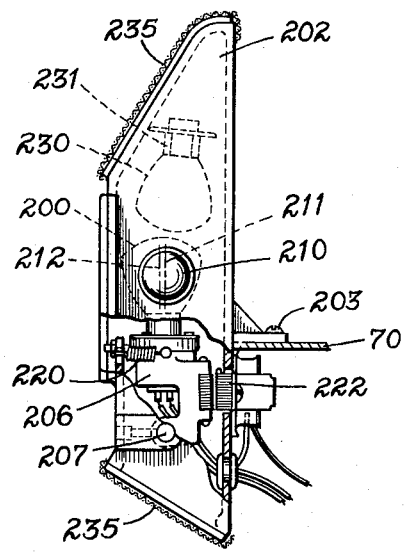
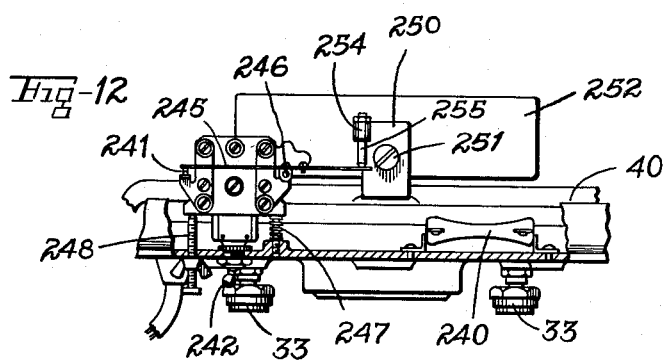
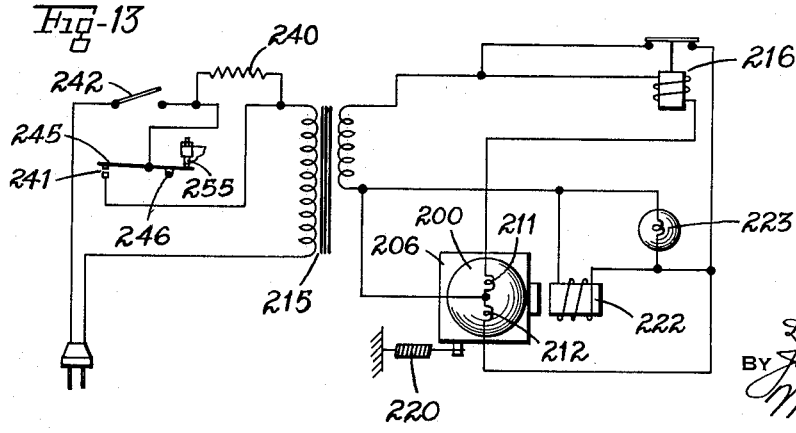

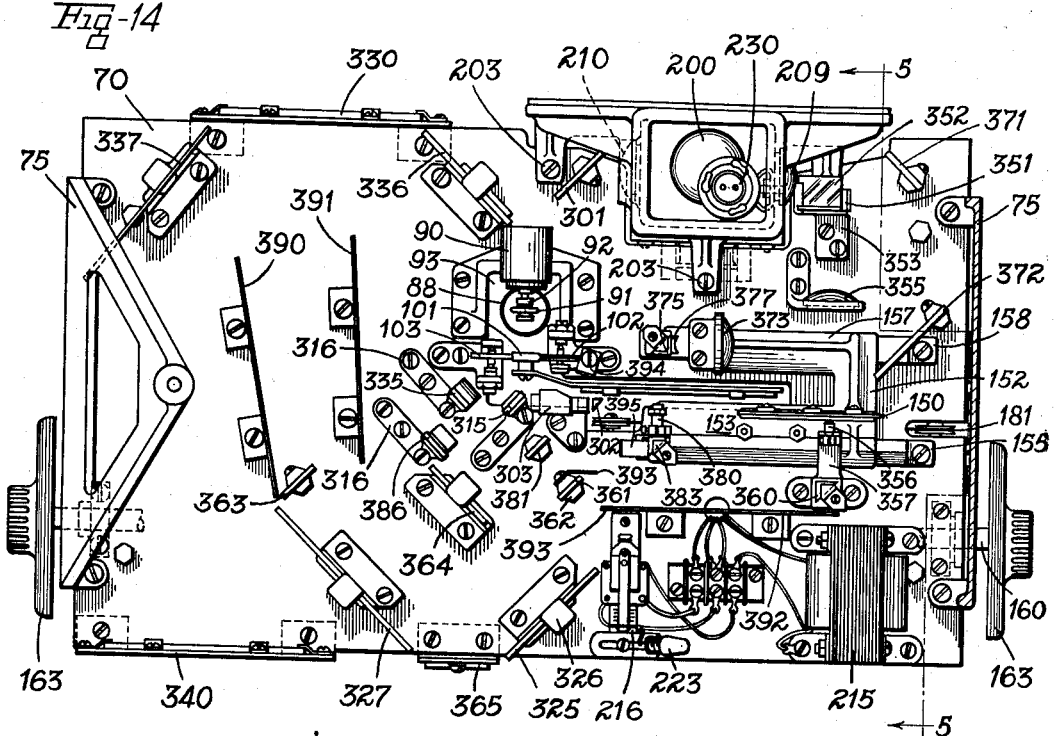
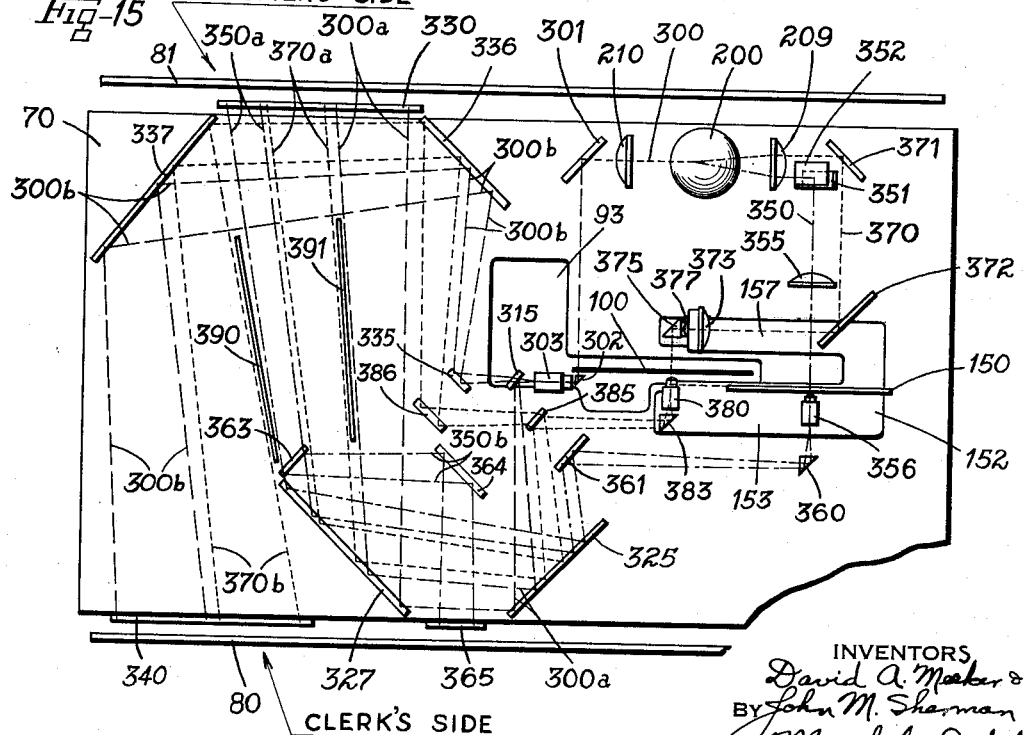

Nov. 8, 1955 D. A. MEEKER ET AL 2,723,113
SCALE
Filed May 11, 1949 8 Sheets-Sheet 6
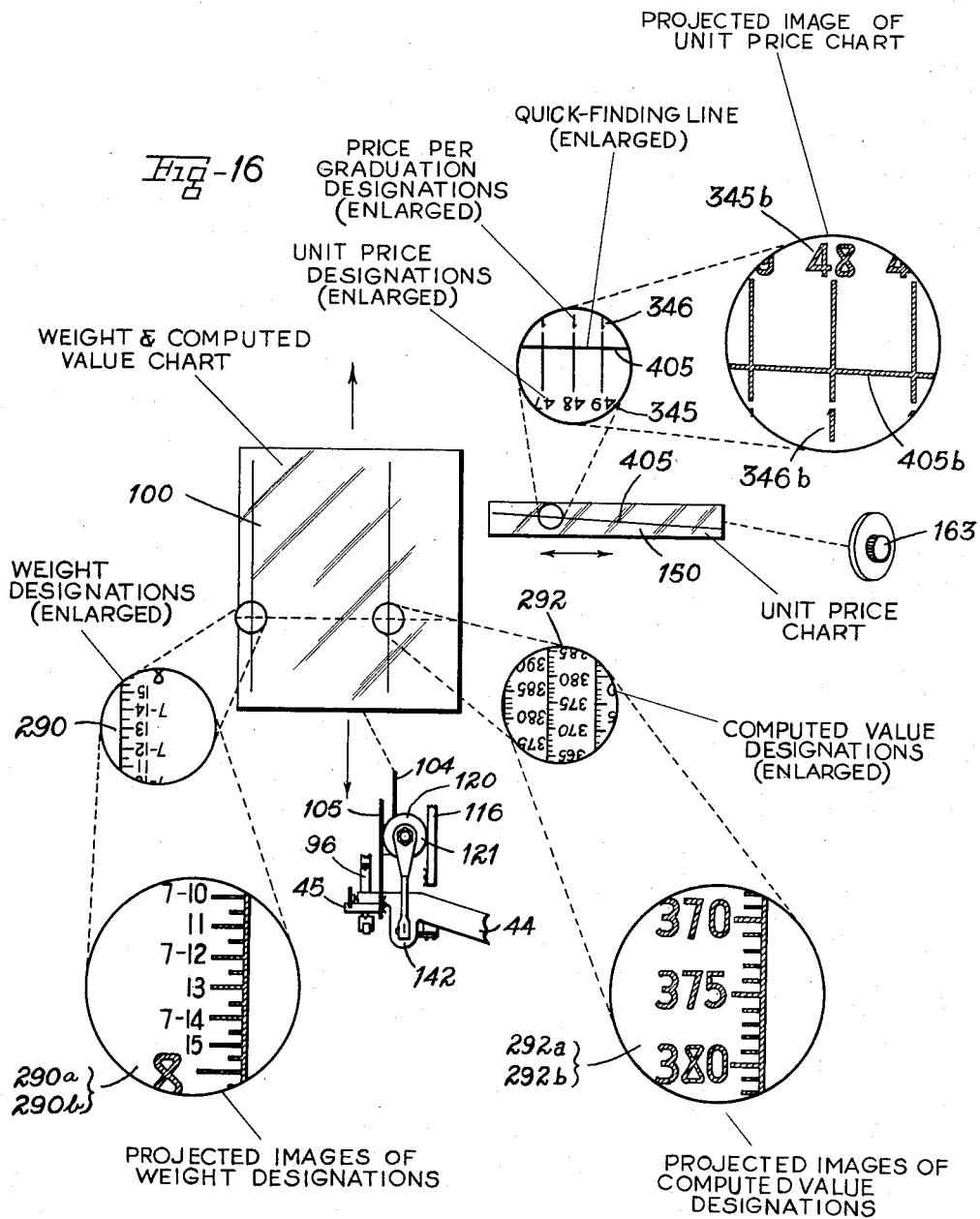
INVENTORS
David A. Meeker
John M. Sherman
BY Marechal & Biebel
ATTORNEYS Nov. 8, 1955     D. A. MEEKER ET AL     2,723,113
SCALE
Filed May 11, 1949     8 Sheets-Sheet 7
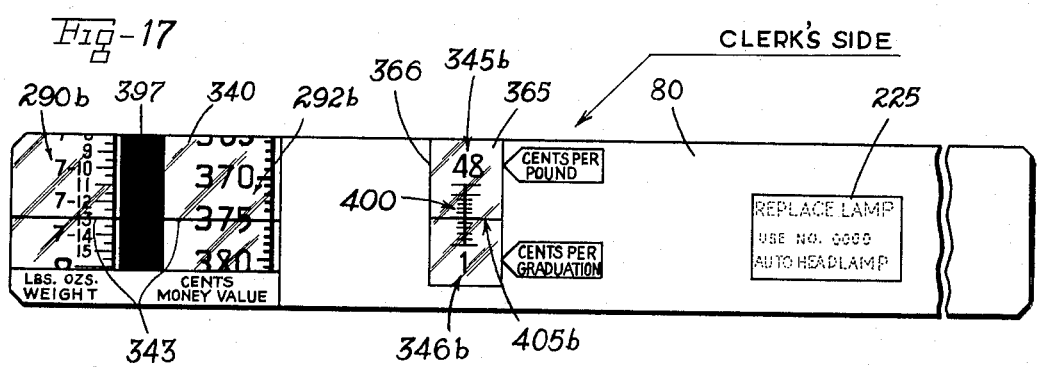
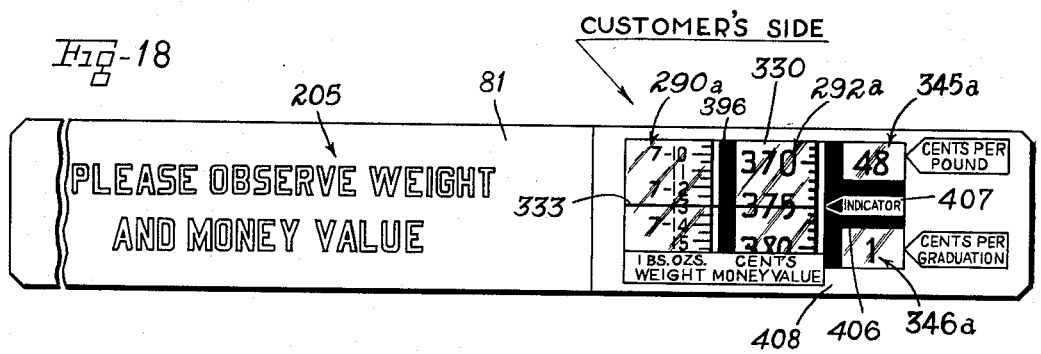
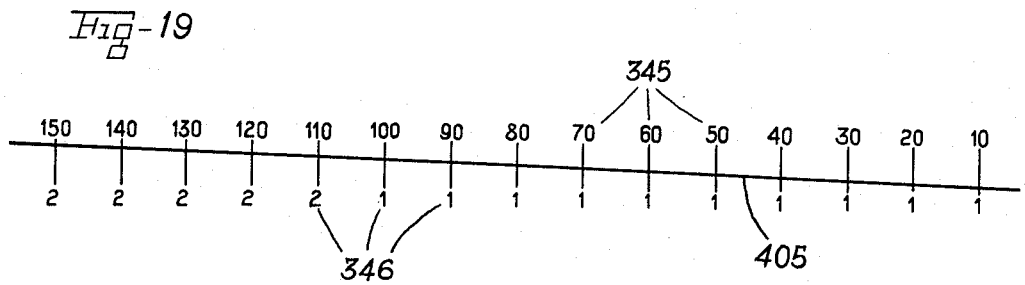
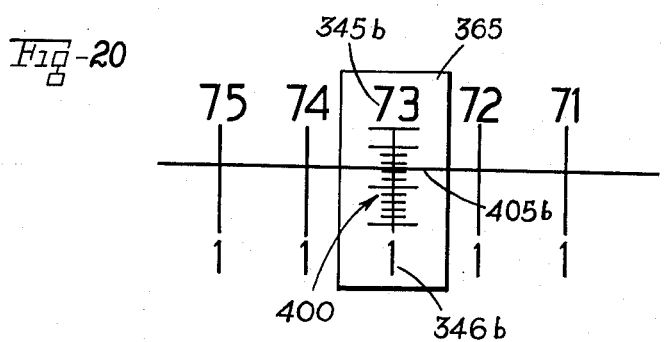
INVENTORS
David A. Meeker
John M. Sherman
BY
ATTORNEYS Nov. 8, 1955 D. A. MEEKER ET AL 2,723,113
SCALE
Filed May 11, 1949 8 Sheets-Sheet 8
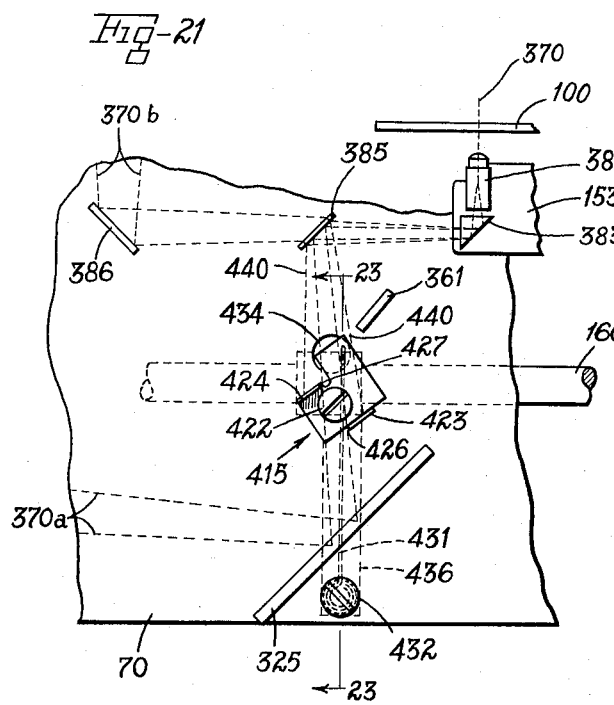
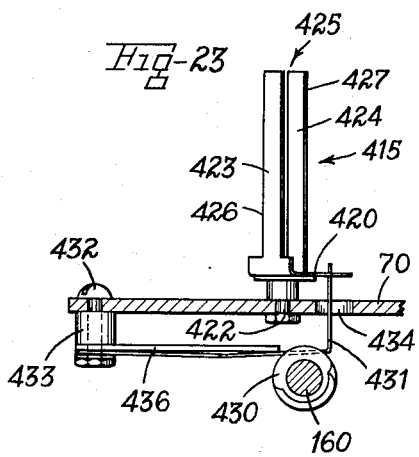
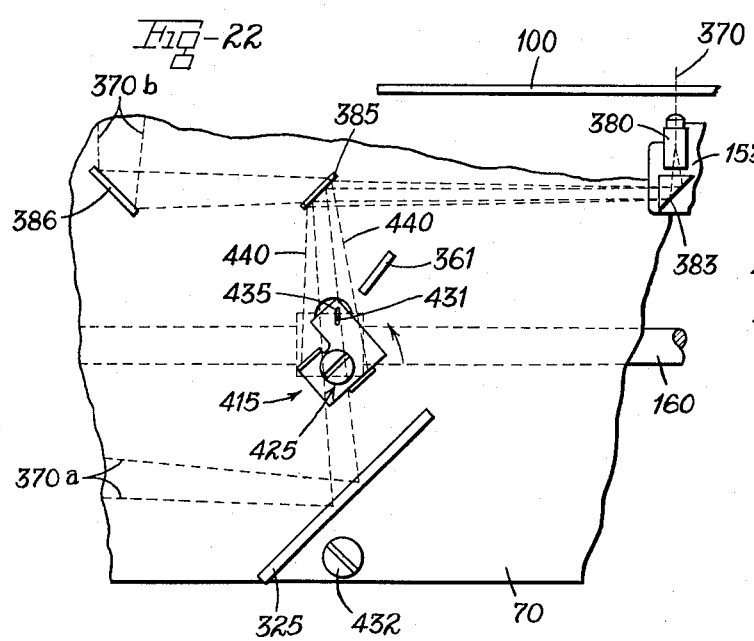
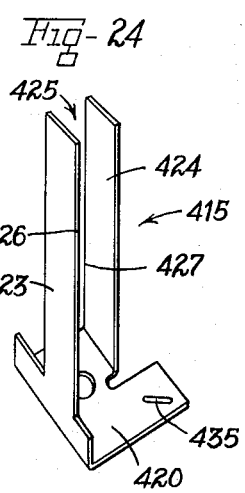
INVENTOR
David A. Meeker and
BY John M. Sherman
Marechal & Biebel
ATTORNEYS

United States Patent Office 2,723,113
Patented Nov. 8, 1955

2,723,113

SCALE

David A. Meeker, Troy, and John M. Sherman, Dayton, Ohio, assignors to The Hobart Manufacturing Company, Troy, Ohio, a corporation of Ohio Application May 11, 1949, Serial No. 92,564

9 Claims. (Cl. 265—29)

This invention relates to weighing scales and more particularly to scales in which separate optically enlarged images of price, weight and value are produced in positions to be read by the clerk and by the customer.

In such scales a light source is provided from which the necessary light beams are obtained to form the several images desired on the opposite sides of the scale. It is essential that the light source not only be reliable, but that it be located accurately in the optical system in order to form the several beams. If the light source were to fail in the midst of a busy period, the scale would no longer be usable, and would require immediate attention in order to return it to service. One of the objects of the invention is therefore to avoid such inconvenience and disruption of use by providing a main and a reserve light source, the reserve light source being automatically put into use upon failure of the main source to avoid interruption in the use of the scale.

It is also an object to provide for moving such reserve light source into the position occupied by the main source so that the optical system will continue to function in the same manner with the reserve source as with the main source.

Even though the reserve light source may have a probable life as long as the main source, it is desirable that the scale not be operated on the reserve source for any extended period, and hence it is another object of the invention to provide an indicator to show that the scale is operating on the reserve source and that the main source should be promptly replaced, thus further assuring against any actual interruption in the use of the scale.

In various localities it is required by law that the no-load or zero position of the scale be readable at all times. If the light source of the present scale were to remain energized at full intensity the entire time in order to comply with this requirement, it would result in need for replacement of the source at relatively frequent intervals. It is another object of the invention, therefore, to provide for meeting the requirement by energizing the light source at full value during the time a weighing operation is being performed, making it possible to read the values readily, but reducing the energization between weighing operations to a level such that while still possible to read the zero position, the useful life of the light source will be greatly prolonged.

In addition to producing images of the weight and computed value, it is also an object of the invention to produce images for both clerk and customer of the unit price and to provide simple and readily operated means by which the clerk can set the price per pound for each operation of the scale through operation of a manual control and by observing the image, rather than by reference to graduations or indications on the manual control itself.

It is a still further object to provide a rapid finder or index to enable the clerk to set the unit price control rapidly to the approximate range, without having to read the separate values, following which the control may be operated slowly and the final position determined accurately by viewing the image of the desired price per pound.

In addition to the above features, the scale of the present invention has other optical and mechanical improvements, such as a mechanism for supporting the chart bearing the weight and computed value graduations and for moving such chart through a greater degree of travel than the lever in order to obtain greater accuracy, and it is therefore an important object of the invention to provide a scale which considered in its entirety is simple and economical in construction, highly accurate and reliable in use, and which affords full information of all factors involved in the weighing operation to both the clerk and customer in such form as to be easily read and understood by both.

Other objects and advantages of the invention will be apparent from the following description, the accompanying drawings and the appended claims.

In the drawings—

Fig. 2 is a fragmentary rear view with the scale housing broken away to show the parts therein;

Fig. 3 is a fragmentary view taken at right angles to Fig. 2 to show the mechanism for supporting the weight chart;

Fig. 4 is a horizontal section taken approximately on the line 4—4 of Fig. 1 and also of Fig. 2;

Fig. 5 is a fragmentary view showing the unit price chart and the supporting carriage and adjusting mechanism therefor, the view being taken approximately as indicated by the line 5—5 of Fig. 14;

Fig. 6 is a fragmentary view in elevation showing the carriage for the unit price chart as viewed from the left in Fig. 5;

Fig. 7 is a perspective view showing the mechanism for adjusting the unit price chart as removed from the scale;

Fig. 8 is a detail view showing one of the adjustable mountings for a mirror in the optical system of the scale;

Fig. 9 is a detail sectional view showing one of the projectors in the optical system;

Fig. 10 is a detail view showing the lamp chimney as viewed from the customer's side of the scale with the scale housing removed;

Fig. 11 is another view of the lamp housing looking from right to left in Fig. 10;

Fig. 12 is a fragmentary sectional view taken on the line 12—12 of Fig. 1 and showing the mechanism for effecting dimming of the light when the scale is at the zero reading;

Fig. 13 is a wiring diagram;

Fig. 14 is a plan view of the upper platform in the chart housing showing the parts constituting the optical system of the scale;

Fig. 15 is a ray diagram similar to Fig. 14 and illustrating the operation of the optical system;

Fig. 16 is a diagrammatic view illustrating the unit price chart and the weight and computed money value chart of the scale;

Fig. 17 is a broken view showing the screens and cover glass on the clerk's side of the scale as viewed during a weighing operation;

Fig. 18 is a view similar to Fig. 17 showing the screen and cover glass on the customer's side of the scale during the same weighing operation;

Fig. 19 is a diagrammatic view of the unit price chart, showing the unit prices only by tens;

Fig. 20 is a diagrammatic view illustrating the operation of the quick-finding mechanism for setting the unit price chart;

Figs. 21 and 22 are diagrammatic fragmentary views illustrating the operation of an adjustable baffle member in two different positions for controlling the effective width of one of the light beams;

Fig. 23 is a fragmentary sectional view approximately on the line 23—23 of Fig. 21 showing the baffle member and the operating mechanism therefor; and Fig. 24 is a detail view of the baffle member in perspective.

Figure 1:
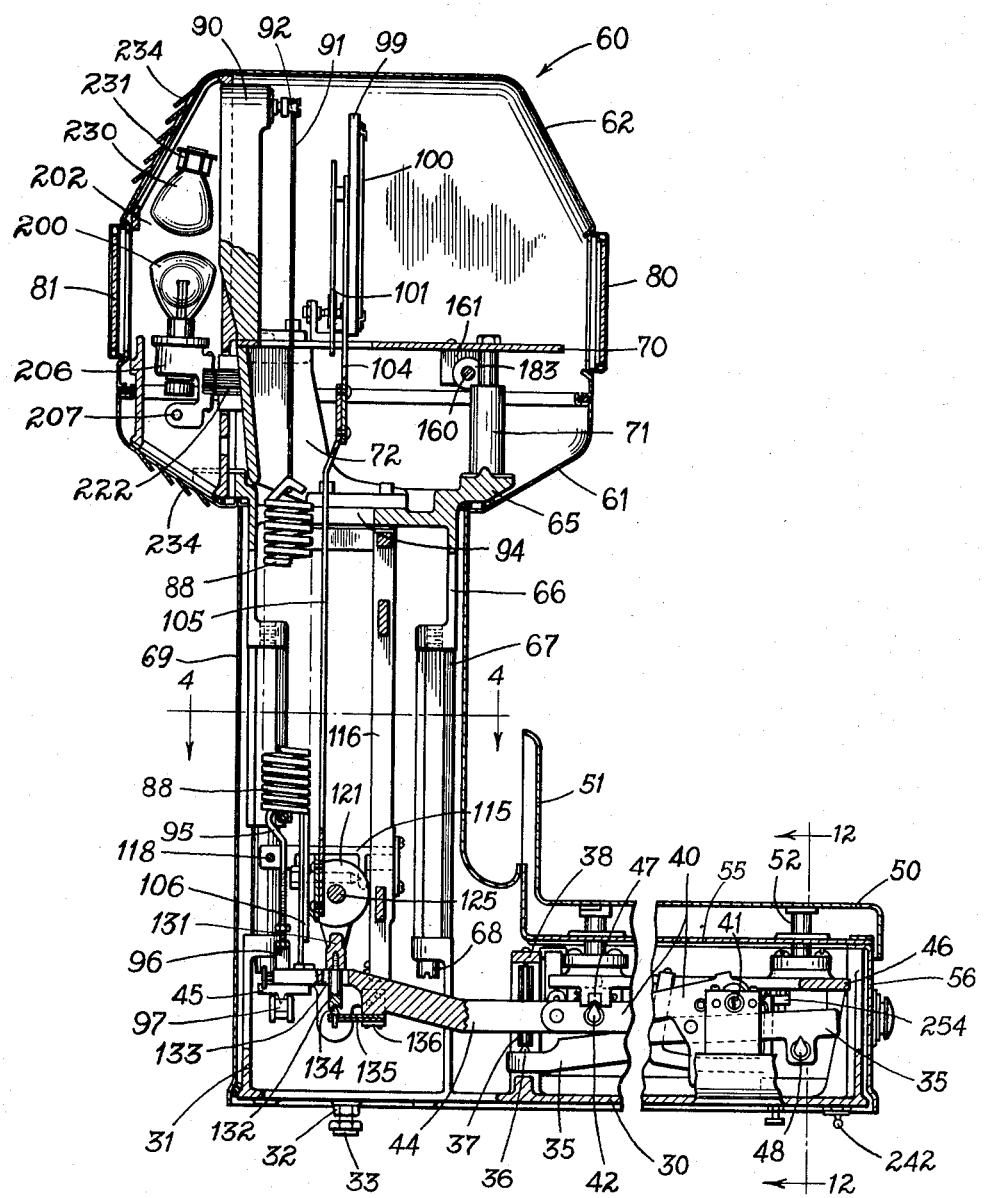
Fig. 1 is a somewhat diagrammatic side view of the scale with the housing and portions of the frame broken away generally in central section and with some parts removed for clarity of illustration.

Referring to the drawings, which illustrate a preferred embodiment of the invention, the scale is shown as having a base 30 made of a ribbed casting which includes a narrower rearwardly extending portion 31 substantially centrally arranged. The casting is formed with portions 32 within which the adjustable feet 33 are received to provide for leveling the base upon its support. This base and the weighing mechanism in the main portion thereof are shown as having substantially the construction disclosed in the copending application of David A. Meeker and Kenneth C. Allen, Serial No. 675,142, filed June 7, 1946, now Patent 2,649,293 issued August 18, 1953, and assigned to the same assignee as this application.

The weighing mechanism is shown somewhat fragmentarily in Fig. 1 as of the double lever type, with the two levers being interfitted with each other. The inner lever 35 is pivoted on floating links, not shown, carried at intermediate points on the outer lever, and its rearward end is fulcrumed by engagement of a projection 36 thereof with a recess in the lower end of a pin 37 having a similar recess at its upper end which receives a downwardly projecting portion of a cross bar 38 suitably supported from opposite ends upon portions of the base casting. The outer lever 40 is pivoted on fulcrum bearings 41 which are fixed to the base 30, and it includes rearwardly extending arm portions on which are secured pivots 42 which form supports for the rearward end of the platter. At its rearward end, the outer lever 40 includes a rearwardly extending arm portion 44 which carries the nose iron 45 at its outer end.

A generally rectangular frame 46 for receiving the platter is supported on the pivots 42, as indicated at 47, and on similar pivots 48 carried by the forward portion of the inner lever 35. The platter 50, which includes an upstanding portion 51 along the rearward edge thereof, is supported by posts 52 which extend upwardly from the corners of the frame 46 through a housing plate 55 which cooperates with the sides 56 of the housing to seal the interior of the weighing mechanism.

The upper housing which encloses the weight and price charts and the optical system of the scale is indicated generally at 60, and it includes a lower casing 61 and an upper casing 62. The housing 60 is carried by a bracket 65 which includes downwardly extending portions 66 supported by spacers 67 and bolts 68 extending upwardly from the rearward portion 31 of the main base, these parts being enclosed by an additional casing 69. Within the housing 60 is a platform 70 which carries the optical system of the scale and is supported on the bracket 65 by upwardly extending bolts and spacers 71 and by a bracket 72 adjacent the middle of bracket 65. The bracket 65 also supports the lower portion 61 of housing 60, and the upper housing portion 62 is carried by brackets 75 (Fig. 14) mounted on the platform 70. It will also be noted that the viewing windows in the front and rear of the housing are covered by a glass plate 80 on the clerk's side and a similar glass plate 81 on the customer's side.

The counterbalancing spring 88 for the scale is supported at its upper end by means of a bracket 90 bolted to the platform 70. A rod 91 is hooked at its upper end to an outwardly projecting stud 92 on bracket 90, and the lower end of this rod is hooked to the upper end of spring 88. It will be noted that the rod 91 extends through one portion of a generally L-shaped opening 93 (Fig. 15) in the platform 70 and through an opening 94 in bracket 65. The lower end of spring 88 is secured to the lever arm 44 by means of a hook or link 95 having its lower end connected to a C-shaped bracket 96 which supports a bearing 97 for the nose iron 45. The particular form of weighing mechanism may be varied as desired, that disclosed herein being for illustrative purposes only.

The chart 100, which carries the appropriate designations with respect to the weight and computed value of the material being weighed on the scale, is mounted in a generally rectangular frame 99 supported for up and down movement in the opening 93 in platform 70 in response to the movements of the levers 35 and 40 during weighing operations. The frame 99 is bolted to a flat bar 101 (Fig. 2) having a knife edge which is received within a complementary grooved roller 102 mounted on the platform 70; the opposite edge of bar 101 is flat and engages a flat roller 103 also mounted on platform 70.

The frame 99 has secured thereto a downwardly extending bar 104 which is secured at its lower end to the upper end of a flat rod 105, and the rod 105 extends downwardly to a position somewhat above the lever arm 44 and is bolted at its lower end to the middle portion of a generally H-shaped plate 106. At its outer sides, this plate 106 has bolted thereto a pair of guide bars 110 having knife edges engaging in complementary grooved rollers 111 carried by needle pointed shafts 112 each mounted in one of a pair of brackets 115. These brackets 115 are in turn bolted at their forward portions to a guide bracket 116 bolted to the bracket 65 and extending downwardly therefrom. At the rear of the scale, the brackets 115 each carry an angle bracket 117, and these latter brackets are connected by a rod 118 to positively and adjustably maintain the distance between rollers 111. It will thus be seen that the rollers 111 and guide bars 110 cooperate to prevent lateral movement of plate 106 in any direction while providing for free movement thereof in a vertical plane.

The rod 105, and through it the chart 100, are connected with the lever arm 44 by means of a pair of flexible tapes 120 which are looped over a pair of rollers 121 and have their ends secured at 122 to the plate 106 and at 123 to the lower ends of the fixed guide bracket 116. The rollers 121 are carried by a shaft 125 having its ends journaled in bearings 126 carried by the upwardly extending arm portions 127 of a generally H-shaped yoke 130, the central web portion 131 of which extends across and immediately above the lever arm 44. A bearing pin 122 (Fig. 1) is screwed into web 131 and extends downwardly through an aperture 133 in the lever arm, and the lower end of this pin has a recess which receives a needle point 134 at the rearward end of a bimetal strip 135 carried by a bracket 136 secured to the lever arm 44. In order to prevent disengagement of pin 132 and needle point 134, each of the downwardly extending portions 140 of yoke 130 carries a flexible retainer rod 141 which extends into a recess in the side of the adjacent downwardly extending fork portion 142 of the lever 44 and is secured to the yoke arm 140 by a set screw 143.

It will accordingly be seen that since the tapes 120 are secured to the fixed frame at their ends 123, their free ends 122 support the chart 100 and its frame 99 through their connection to plate 106, and as the rollers 121 move up or down, this will cause proportional movement in the same direction of the free ends of the tapes and thus of chart 100. Since the rollers 121 are in turn supported by lever arm 44 through its connection with yoke 130, when the lever arm moves downwardly in response to downward movement of platter 50 during a weighing operation, yoke 130 and rollers 121 will similarly move downwardly. During this movement of the yoke, the weight of chart 100 and its supporting structure on free ends of the tapes will cause them to move downwardly by gravity through a distance equal to twice the downward travel of the yoke and rollers to produce a similar downward movement of the chart 100 through a distance which is twice the downward travel of lever arm 44. This movement will be substantially frictionless, as the result of the guide and roller constructions described, and the load of the chart and its supporting parts on the lever arm can be readily compensated for in the initial setting of the scale. The bimetal strip 135 effects compensating adjustment of the zero reading of the scale in accordance with changes in temperature.

A chart 150 (Fig. 5) carries the designations with respect to the price per pound or other unit of weight of the material being weighed on the scale, and it is carried by an upwardly extending portion 151 of a carriage 152 mounted for lateral sliding movement on the platform 70. The carriage 152 is generally U-shaped as viewed from above to extend around one end portion of slot 93 (Fig. 15), and one leg 153 of this carriage has a V-groove in the under side thereof which is received over a generally V-shaped track member 155 bolted at 156 to the platform 70 (Fig. 5). The other leg 157 of carriage 152 has a plane under surface which rides on the complementary plane upper surface of a guide rail 158 which is also bolted to platform 70.

Fig. 7 illustrates in detail the mechanism for effecting back and forth lateral shifting movement of carriage 152 to adjust the unit price chart 150 and select corresponding computing columns of chart 100. A shaft 160 is journaled in pillow blocks 161 and 162 bolted to the under surface of platform 70, and this shaft extends outwardly at both ends through the housing 60 to receive adjusting knobs 163. Rotation of shaft 160 is limited to a desired number of degrees by means of a tumbler or stop disk 165 freely mounted on shaft 160 adjacent the bearing block 161 and including a tongue portion 166 which is arranged for engagement with a pin 170 carried by block 161 and a similar pin 171 carried by a collar 172 secured to shaft 160. The pin 171 is located radially inwardly of pin 170 for clearance, and tongue 166 accordingly has a pair of flats 173 adjacent its outer end for engagement with pin 170 and a similar pair of flats 174 adjacent the body of tumbler 165 for engagement with pin 171.

It will thus be seen that rotation of shaft 160 in either direction will be terminated when the pin 171 is abutting one of the flats 174 on the tongue 166 and the flat 173 on the opposite side of this tongue is in abutting relation with the stationary pin 170. Then when the shaft is rotated in the reverse direction from this limit position, the collar 172 will carry pin 171 around the cam until it engages the opposite flat 174 of tongue 166, and continued rotation of the shaft will cause the cam to be carried around until the opposite flat 173 abuts the stationary pin 170. This arrangement as shown is such as to allow slightly less than two revolutions of the hand wheels 163 which can be manually adjusted by the clerk while continuing to observe the screen.

In order to effect shifting movement of carriage 152 in response to rotation of shaft 160, a retainer plate 175 is connected by means of studs 176 to the under side of the carriage, and the forward portion of this plate extends through the slot 177 between the under surface of track member 155 and platform 70. The studs 176 are provided with springs 178 as shown in Fig. 5 to form a yielding connection between carriage leg 153 and the plate 175 preventing them from binding on track member 155. The plate 175 carries a stud 179 from which a cord 180 extends over pulleys 181 and 182 to a drum 183 on shaft 160, the pulleys 181 and 182 being mounted on platform 70 by means of brackets 184 (Fig. 5). A similar cord 185 is connected with stud 179 through a coil spring 186, and cord 185 extends over pulleys 187 and 188 and is secured to the opposite side of drum 183 from cord 180. Thus as shaft 160 is rotated in either direction, one of the cords 180 and 185 will be caused to wind on drum 183 while the other cord is unwinding, thus causing the plate 175 to slide back and forth and to carry with it the carriage 152. The spring 186 maintains a tight condition in the cords, preventing slack therein.

The lamp bulb 200 which forms the light source for the optical system of the scale is housed in a chimney 202 (Figs. 10 and 11) bolted at 203 to platform 70 and positioned at the customer's side of housing 60, and the chimney 202 includes an elongated window aperture 204 facing the customer for directly illuminating a sign on glass 81 such as that indicated at 205 in Fig. 18. The bulb 200 is of the double filament type and is mounted in a socket 206 pivoted on a horizontal axis in the sides of the chimney 202 by means of pivot pins 207. Two condensing lenses 209 and 210 are mounted in opposite sides of the chimney 202, and the pivotal mounting of socket 206 provides for bringing either one or the other of the filaments 211 or 212 of the lamp into accurate alignment or focus with the optical axes of these lenses.

A mechanism is provided for energizing only the one of filaments 111 and 212 which is aligned with lenses 209 and 210, referred to as the main light source, and for automatically energizing the other filament, referred to as the reserve source, and simultaneously shifting it into the proper alignment with the lenses when the main source burns out or otherwise fails. Referring to the wiring diagram in Fig. 13, the current for energizing bulb 200 is supplied from the secondary of a transformer 215 which steps down the voltage to a low value such that the bulb used may conveniently be an ordinary automobile headlight bulb. The filament 211 serves as the main light source, and it will be seen that the current is supplied thereto through the energizing coil of a magnetic switch 216 so arranged that its contacts are opened when the coil is energized. The other filament 212, which serves as the reserve light source, is energized through these contacts of switch 216, and thus as long as filament 211 is energized, the circuit through filament 212 is open. A coil spring 220 is connected to socket 206 and chimney 202 in such manner as to bias the socket to a position in which filament 211 will be aligned in proper focus with lenses 209 and 210, and a magnet 222 having its energizing coil connected in parallel with filament 212 is mounted in such position that when energized, it will exert a pull on the socket in opposition to spring 220 to swing the socket into a position wherein filament 212 is in alignment with the lenses.

It will accordingly be seen from Fig. 13 that when the filament 211 is energized, magnet 222 will be deenergized, and thus spring 220 will hold socket 206 at the proper position to align main filament 211 with lenses 209 and 210. If filament 211 burns out, this will break the circuit through the coil of switch 216 and thus cause the contacts of this switch to be closed to complete the energizing circuit through reserve filament 212. At the same time, the magnet 222 will be energized to move socket 206 into the position of alignment between filament 212 and lenses 209 and 210 to bring filament 212 into proper focus. In addition, a warning lamp 223 is connected in the circuit to be energized at the same time as the magnet and filament 212, and this lamp is positioned adjacent the glass 80 on the clerk's side of housing 60 and just behind a warning designation on this glass indicated at 225 in Fig. 17. Thus when main filament 211 fails and the reserve filament 212 goes into operation, the resulting energizing of lamp 223 lights up the sign 225 so that the clerk immediately knows that he should replace bulb 200 as soon as convenient in order to assure always having one filament in reserve and thus to guard against complete failure of the optical system.

In order to facilitate maintenance of the scale, a spare bulb 230 is mounted in the upper part of chimney 202 in a suitable receiving clip 231 secured to the chimney. It will also be noted that the chimney 202 is constructed to promote effective ventilation for bulb 200 to minimize the possibility of overheating the surrounding portions of the scale. As shown in Figs. 10 and 11, the chimney has an opening 232 at its lower end and also an opening 233 at its upper end, and louvers 234 are provided in the housing 60 above and below these openings to promote continuous upward flow of air through the chimney. In order to screen the housing against the entry of insects attracted by the light from bulb 200 through louvers 234, the chimney fits closely against the housing at both ends, and the openings 232 and 233 are covered with wire mesh 235.

Provision is also made for reducing the voltage to bulb 200 when the scale is at its zero reading to prolong the life of the bulb. However, since some state laws require that the zero reading of the scale be readily visible at all times to the customer, the voltage is maintained at a sufficient level to assure this result. Referring to Figs. 12 and 13, a resistor 240 shunted by a switch 241 is connected in series with the primary of transformer 215, this switch and resistor being mounted on the base 30 at the front of the scale adjacent a manually operated toggle switch 242 which controls the lighting circuit. The switch 241 includes an operating arm 245 which is pivoted at 246 and is gravity biased to the closed position. The spring 247 is a positioning spring which cooperates with adjusting screw 248 to simplify adjustment of the operating point of switch 241.

The front portion of the outer lever 40 of the weighing mechanism includes an arm 250 (Figs. 1 and 12) which receives the adjusting screw 251 for the zero adjustment weight 252, and arm 250 includes a boss 254 provided with a downwardly extending pin 255 which contacts switch arm 245 and is adjusted and arranged to permit the switch arm to open switch 241 when lever 40 is at its rest position in which there is no weight on the scale platter. Accordingly, when the scale is thus at its zero reading, the switch 241 is open, and the voltage to the bulb 200 will be reduced as a result of passage of the current through the resistor 240. However, as soon as weight is placed on the scale, movement of lever 40 will result in closing of switch 241 as the pin 255 rises away from arm 245, thus shorting out the resistor 240 and supplying the full voltage to the transformer to light bulb 200 to its full intensity. At the end of the day, the clerk opens switch 242 to completely de-energize the scale.

The optical system of the scale is arranged to provide both the clerk and the customer with projected images of the selected unit price and the weight and the computed values of the materials weighed. Referring particularly to Figs. 14 to 16, the weight designations on the chart 100 are arranged in a single vertical column adjacent the left-hand margin of the chart, as viewed in Figs. 14 to 16, a portion of the weight designations on an enlarged scale being indicated by reference numeral 290 in Fig. 16. The zero weight designation is at the bottom and the scale increases upwardly so that as the chart 100 moves downwardly in response to increased weight on the platter, the corresponding larger weight designations will move into image producing position. The remainder of the chart surface is taken up with computed value designations arranged in series of vertical columns, each corresponding to a different unit price, the lowest unit price column being at the right of the plate and increasing toward the left as viewed in Fig. 16. A portion of the computed value designations on an enlarged scale is indicated by reference numeral 292 in Fig. 16.

The light beam projecting the images of the proper weight designation, which is represented by the long dash line 300 in Fig. 15, emanates from bulb 200 and passes first through the condensing lens 210 to a mirror 301 which turns it through 90° and causes the beam to travel in the proper direction to pass through the weight column of chart 100. The beam 300 is then again turned through 90° by a prism 302 and caused to pass through a projector 303, this prism and projector being both car- ried by the same bracket 304 mounted in fixed position on platform 70. The construction of projector 303 is shown in detail in Fig. 9, and it includes a barrel 305 within which are mounted a pair of lenses 306, a pair of spacer sleeves 307 and an annular stop 308. It will also be noted that the central bore of barrel 305 is eccentrically arranged to provide for vertical and lateral adjustment of the projector within the clamp portion 310 of bracket 304, the barrel being provided with a hexagonal portion 311 to facilitate such adjustment.

After leaving projector 303, the beam 300 impinges on a transparent mirror 315 which separates it into two beams, a beam 300a which carries the image to the customer and a beam 300b which carries the image to the clerk. The transparent mirror 315 is carried by an adjustable mounting bracket 316 shown in detail in Fig. 8. This bracket is slotted and bored horizontally to provide an upper portion 317 flexibly connected at 318 with the base portion 319 which is bolted to platform 70. The upper bracket portion 317 is provided with a mounting slot 320 which carries the mirror, and an adjusting screw 321 provides for movement of the bracket portion 317 about its connection 318 to the base of the bracket, thus tilting the mirror for adjustment purposes to vary the angle of reflection of beam 300 in a vertical plane.

The beam 300a to the customer is reflected by the transparent mirror 315 to a mirror 325 in a fixed mounting bracket 326, from which it is again reflected by a mirror 327 to a ground glass screen 330 mounted on platform 70 at the customer's side of housing 60 behind a clear area of glass 81 and having an index line 333 (Fig. 18). The beam 300b to the clerk traverses the transparent mirror 315 and then strikes a plane mirror 335 carried by an adjustable mounting bracket 316. From this mirror, the beam is reflected by a further pair of mirrors 336 and 337 to a ground glass screen 340 mounted on platform 70 behind a clear area at the left-hand end of glass 80 and having an index line 343 (Fig. 17). During this passage from projector 303, it will be seen that the light image of the weight designations 290 on chart 100 are enlarged as indicated at 290a and 290b in Fig. 16 for the customer and clerk respectively. It will also be noted that the original designations on the chart are suitably reversed, inverted and enlarged by passage through the projecting lenses and mirrors to produce upright, correctly reading images on the screens 330 and 340 of such size as to be easily read at a distance. It will also be seen that each portion of the beam goes through such multiple reflections and transformations so that the images on both screens appear upright and not reversed. Accurate registry of beam 300a with the index line 333 on screen 330 is obtained by adjustment of the adjusting screw 251 (Fig. 12) for the zero adjustment weight 252, and registry of the beam 300b with the index line 343 on screen 340 is then obtained by adjustment of the mounting bracket 316 for mirror 335 as described.

The unit price chart 150 has price per pound designations running laterally across the lower portion thereof, a part of such designations being indicated on an enlarged scale by reference numeral 345 in Fig. 16. The optical system is adapted to cause the image of the proper selected one of these figures to appear opposite the corresponding "Cents Per Pound" index mark on the screens 330 and 365. In addition, the chart 150 carries a row of figures 346 along the upper portion thereof, and an image of the appropriate one of these figures is similarly projected on both screens opposite the "Cents Per Graduation" index mark. A portion of such figures is shown on an enlarged scale by reference numeral 346 in Fig. 16. The figures 346 refer to the size of the graduations on the computed value section of chart 100, each of these graduations being equal to one cent for unit prices up to an arbitrarily selected value, such as $1.00 per pound and to two cents for unit prices above $1.00 per pound. These "Cents Per Graduation" designations thus facilitate quick reading by both the clerk and the customer of the image of the computed value designations.

The light beam for projecting the images of the proper unit price designation is represented in Fig. 15 by the line 350 composed of alternating long and short dashes. This beam travels from the same bulb 200 as beam 300 through the condensing lens 209 and is then elevated by means of a pair of mirrors 351 and 352 carried by a bracket 353 and each arranged at 45° to platform 70 with their vertical reflection planes at 90° to each other as shown in Fig. 5. It will also be noted in Fig. 5 that the lower mirror 351 is positioned to intercept the left-hand half of the beam traversing lens 209. The mirrors 351 and 352 thus raise the beam 350 to the proper level for travel through the unit price chart 150, and the beam travels from mirror 352 through a condensing lens 355 mounted on platform 70 and then through the chart 150 to a projector 356 mounted in a bracket 357 bolted to platform 70. The projector 356 may be adjustable as described in connection with Fig. 9, or a fixed projector may be used.

The bracket 357 carries a right-angled prism 360 arranged to turn beam 350 through 90°, and the beam then travels to a mirror 361 mounted on the platform 70 by means of a bracket 362, and from this mirror it is reflected by the mirrors 325 and 327 to a transparent mirror 363 carried by a mounting bracket 362. The beam 350a which is transmitted by mirror 363 travels directly to the proper position on screen 330 at the customer's side of the screen as indicated at 345a and 346a in Fig. 18. The beam 350b reflected by mirror 363 is reflected by a further mirror 364 to form images 345b and 346b on a screen 365 mounted on platform 70 behind a clear area 366 of glass 80, the remaining areas of glass 80 being opaque.

The beam which forms the images of the computed value of the material being weighed is represented in Fig. 15 by the short dash line 370, and it travels initially from the same bulb 200 through the right-hand side of lens 209 as viewed in Fig. 5 to a mirror 371 mounted on platform 70, which reflects it through 90°. The beam 370 then travels to a mirror 372 also mounted on the platform but extending into line with the leg 157 of the carriage 152 and arranged to reflect the beam in a direction parallel with the direction of travel of carriage 152 to a condensing lens 373 which is carried by a bracket 374 on the carriage leg 157. The beam 370 is then turned through 90° by a right-angled prism 375 mounted on a boss portion 376 of carriage leg 157 and having a concave collimating lens portion 377 on the entering face thereof.

The resulting collimated beam then travels through the chart 100 to a projector 380 similar in construction to the projector 303 and carried by a clamp portion 281 of the opposite leg 153 of carriage 152. The carriage leg 153 also includes a boss 382 which carries a right-angled prism 383 arranged to turn beam 370 through 90° and to direct it parallel with its direction of travel between mirror 372 and lens 373 towards a transparent mirror 385 mounted on the platform 70. The beam 370a reflected by mirror 385 is further reflected by the mirrors 325 and 327 to the proper position on screen 330 to form the image 292a, and the transmitted beam 370b is reflected by a further mirror 386 to the mirrors 336 and 337 and thence to the proper position on the screen 340 to form the image 292b.

It will be seen that since the prism 375 and projector 380 are both carried on carriage 152, movement of the carriage to select the unit price according to chart 150 will cause lateral shifting of beam 370 with respect to chart 100 to a position on the chart corresponding to the selected unit price. Since the vertical position of chart 100 corresponds to the weight on the platter, it will be clear that the light beam 370 will actually pass through this chart at a position to form an image of a computed value corresponding to the product of such weight and the selected unit price. It will also be noted that since the shifting movement of carriage 152 is parallel with the direction of travel of beam 370 between mirror 372 and prism 375 and also between prism 383 and mirror 385, this movement does not affect the location of the image produced on screens 330 and 340 but only shifts the beam into registry with the particular vertical column of computed value figures on chart 100 which corresponds with the selected unit price.

Provision is made by means of suitable baffles or shields for preventing possible interference of the light beams carrying the different images in the optical system. Referring to Figs. 14 and 15, baffles 390, 391 and 392 are mounted on platform 70, and a baffle 393 is carried by the mounting bracket 362 and mirror 361. Another baffle 394 is shown as mounted on the supporting bracket for the guide roller 102, and a baffle 395 is mounted on the boss 382 which supports prism 383 on the carriage 152. Similarly, opaque mask portions 396 (Fig. 18) and 397 (Fig. 17) are provided on screens 330 and 340 between the images of the weight and computed value to facilitate viewing.

It is desirable to enable the clerk to effect rapid setting of the unit price chart 150 to select the proper unit price at the beginning of a weighing operation. However, if the knobs 163 are rotated rapidly, the images of the figures on the chart flash over the screens too rapidly for ready viewing. To avoid having to turn these knobs slowly and thus prolong the setting operation, a quick-finding arrangement is provided for the clerk to facilitate rapid selection of the desired unit price.

Referring to Figs. 16, 19 and 20, the unit price chart 150 is shown as carrying designations representing prices ranging from 10¢ to $1.50 per pound, as indicated schematically in Fig. 19 wherein the prices are shown increasing by intervals of 10¢ with the intermediate values omitted from the view merely for purposes of simplicity of illustration. For example, a typical chart is graduated in intervals of one cent from 10¢ and $1.00 and with selected intermediate values between $1.00 and $1.50, such as $1.03, $1.05, $1.07, $1.13, $1.15, $1.17 and $1.25.

The quick-finding arrangement includes an index 400 (Figs. 17 and 20) formed of opaque graduated lines on the ground glass screen 365. This index 400 is correlated with the graduations on chart 150 and includes ten graduations corresponding to the prices in even tens up to $1.00 and an additional larger graduation corresponding to the portion of the chart between $1.00 and $1.50. A line 405 (Figs. 16 and 19) is arranged diagonally on chart 150 between the two rows of figures 345 and 346, and this line is so calibrated that its image 405b on screen 365 (Figs. 17 and 20) appears at a position with respect to index 400 which corersponds with the particular setting of the unit price control at that instant. Thus as indicated in Fig. 17, when the unit price selected is "48," the image of 405b will appear just below the graduation corresponding to 50¢ on index 400. Fig. 20 shows an example of another setting where numerals "73" appear on screen 365, and image 405b appears between the graduations corresponding to 70¢ and 80¢, respectively, on index 400.

It will accordingly be seen that when the clerk sets chart 150 by rotation of knobs 163, the image of line 405 will appear to rise or fall along the index 400 in accordance with the change in the setting of this chart. The clerk can thus observe the position of this line image without attempting to watch the images of the figures themselves, and which the control knobs are being rapidly turned, until the line appears at approximately the proper position on index 400; this initial adjustment of the chart is thus carried out relatively quickly. Then when the image 405b of line 405 approaches the proper position on index 400 which corresponds with the desired unit price of the material to be weighed, accurate setting of the chart can be carried out at a slower rate until the image of such selected unit price designation appears on the screen. Since this quick-finding arrangement does not need to be shown to the customer, the portion 406 of screen 330 corresponding to the index 400 is made opaque as shown in Fig. 18, this opaque portion also including a pointer and legend 407 indicating the index line 333 and being extended vertically to form a mask between the images of the computed value and unit price similar to the masks 396 and 397. The area 408 of glass 81 surrounding screen 330 is also preferably opaque.

In the use of this scale for a typical weighing operation, the clerk first adjusts the unit price chart as just described until the image of the selected unit price designation is in registry with the "Cents Per Pound" index marks on screens 330 and 365, for example a price of 48¢ per pound as indicated in Figs. 16 to 18. It will be understood that this setting operation simultaneously effects lateral shifting of beam 370 to a position wherein it passes through the particular column of computed value figures on chart 100 which corresponds with this selected unit price. Independently of this unit price setting, the movement of the platter 50 and lever 44 under the weight of the material on the platter causes movement of chart 100 which produces an image of the proper weight, and the correct computed value will appear when the proper unit price has been selected, as shown in Figs. 16 to 18. Both the clerk and customer thus simultaneously see on screens 340 and 365 and screen 330, respectively, images of all three values, namely, weight, unit price and computed value, which are large and easily read and interpreted. In addition, all of these images are formed by light beams from the same single light source, and mechanism is provided for automatically putting a reserve light source into operation immediately upon failure of the main light source and simultaneously providing a visual indication that the main source has failed, thus assuring continued reliable operation of the scale.

Figs. 21–24 illustrate the operation of an adjustable baffle member for controlling the effective width of one of the light beams. While such a baffle may be used in conjunction with any of the beams, it is found to be desirable particularly in connection with the beam which carries the image of the computed values because of the fact that when the carriage 152 is shifted to select different settings for the unit price chart 150, this movement will have the effect of varying the distance traveled by the beam 370 from the chart 100 and projector 380 to the screens 330 and 340. This will in turn cause corresponding variation in the effective widths of the beams 370a and 370b. Such variation in width is not objectionable at screen 340, since only two images are projected onto that screen, and these images are relatively widely spaced and can accordingly be provided with a correspondingly wide mask 397 on the screen to conceal overlapping portions thereof. On the other hand, the screen 330 at the customer's side of the scale receives all three images in relatively closely spaced relation, with the image of the computed value being positioned between the other two images and with the mask portions 396 and 406 considerably less wide than the mask 397 on screen 340. In order, therefore, to prevent undesirable interference with image 290a as a result of variation in the width of the beam carrying image 292a, the adjustable baffle means is provided for adjustment in response to the operation of the shifting means for carriage 152 in such manner as to control the effective width of beam 370a and to limit the image on screen 330 to effectively the single column of computed value figures corresponding to each setting of the unit price chart.

Referring to Figs. 21 and 23, an adjustable baffle member 415 is mounted on platform 70 between the transparent mirror 385 and mirror 325. This baffle member includes a base portion 420 which is mounted for rotation on a vertical axis by means of a stud 422 set in platform 70. Two shield portions 423 and 424 extend upwardly from opposite sides of the plate 420 in parallel but laterally offset relation, and the baffle member is so arranged in the path of beam 370a that these shield portions define a vertical slit 425 between their cooperating edges 426 and 427. It will thus be seen that rotation of baffle member 415 on stud 422 will cause variation in the effective width of slit 425 with respect to beam 370a, and means are provided for causing such rotation of the baffle member in response to movement of carriage 152 in order to adjust the width of the slit in accordance with the setting of the unit price chart.

As shown in Figs. 21 and 22, movement of carriage 152 will result in changing the distance between the transparent mirror 385 and the prism 383, which is carried by the leg 153 of carriage 152. In order to rotate baffle member 415 as the carriage moves, a worm 430 is secured to shaft 160 below the baffle member. An L-shaped wire 431 is secured at one end to the under side of platform 70 by means of a bolt 432 and spacer 433, and this wire extends across and lies in the thread of worm 430. The free end of wire 431 is bent up at approximately a right angle and extends through an opening 434 in platform 70 into a slot 435 in the base portion 420 of baffle member 415. A keeper bar 436 for wire 431 is also mounted on bolt 432 to hold the wire in engagement with worm 430, and it will thus be seen that rotation of the worm will cause lateral travel of the wire and thus in turn cause rotational movement of the baffle member as a result of the engagement of the end of the wire in slot 435.

Fig. 21 shows the relative positions of these parts for a setting of the unit price chart near the higher price end of chart 150, in which setting the prism 383 is approaching its closest position with respect to mirror 385. The baffle member 415 is accordingly adjusted to narrow the effective width of slit 425, and it will be seen that beam 370a transmitted through this slit is composed of a relatively small portion of the entire beam reflected from mirror 385, the outer rays of this beam, which are represented by the broken lines 440, being intercepted by the shields 423 and 424.

Fig. 22 shows the relative positions of these parts with the carriage 152 moved to a setting corresponding to a lower unit price than in Fig. 21, and in this setting the prism 383 is at a substantially greater distance from mirror 385 and the distance traveled by beam 370 is correspondingly greater. As a result, the baffle member 415 has been adjusted in response to the movement of the carriage by rotation as indicated by the arrow in Fig. 22 to a position substantially increasing the effective width of slit 425 and the actual width of beam 370a at the slit. However, since the divergence of the rays forming beam 370a is less for this setting than in the case shown in Fig. 21, the effective width of the beam at screen 330 will be approximately the same in the case illustrated in Fig. 21. Thus movement of carriage 152 will cause corresponding rotation of the baffle member to control the effective width of slit 425 to limit the image visible on screen 330 to the proper column of computed value figures for all settings of the unit price chart While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a weighing scale of the character described including a frame and a weighing mechanism, the combination of a lever movable in response to movement of said weighing mechanism, a chart, means guiding said chart for movement, a support for said chart, a roller, pivot means for said roller carried by said lever for movement therewith in response to weighing movement of said lever, and a flexible member looped about said roller and secured at one end to said frame and at its other end to said support to carry said support and said chart for movement relative to said frame in response to movement of said lever and through a distance proportionally greater than the travel of said lever.

2. In a weighing scale of the character described including a frame and a weighing mechanism, the combination of a lever arm movable in response to movement of said weighing mechanism during a weighing operation, a movable weight chart, a support for said chart, a pair of rollers, a yoke straddling said lever arm, means supporting said yoke on said lever arm for movement therewith in response to weighing movement of said lever, pivot means carried by said yoke for supporting said rollers at either side of said lever arm for movement with said yoke, a pair of flexible members each looped over one of said rollers and extending downwardly on either side thereof, and means securing one end of each of said flexible members to said frame and the other end thereof to said support to carry said support and said chart for movement relative to said frame in response to movement of said lever arm and through a distance proportionally greater than the travel of said lever arm.

3. In an optical computing scale having a weighing mechanism, the combination of a screen, a single light source, a first chart having designations of computed values, means controlled by said weighing mechanism for bodily moving said chart in the plane thereof, a second chart having designations of unit price, a carriage for said second chart movable in a direction parallel with the plane of said first chart, means for directing a first light beam from said source through said first chart to project an image of one of said computed value designations on said screen, said directing means including a stationary optical element for causing said beam to travel parallel with said direction of movement of said carriage and a pair of optical elements supported by said carriage on either side of said first chart for directing said beam from said stationary optical element through said first chart, and then causing said beam to travel parallel with said direction of movement of said carriage, stationary means for directing a second beam from said source through said second chart to project an image of one of said unit price designations on said screen, and means for effecting movement of said carriage to shift said second chart with respect to said second beam in accordance with selection of the unit price and to shift said first beam with respect to said first chart in accordance with said selected unit price.

4. In an optical computing scale having a weighing mechanism, the combination of a first chart having designations of weight and computed values, a second chart having designations of unit prices, a screen, a single light source, means for directing a first light beam from said source toward said first chart to produce an image of said weight designation on said screen, means for directing a second light beam from said light source toward said first chart to project an image of said computed value designation on said screen, means for directing a third light beam from said source toward said second chart to project an image of said unit price designation on said screen, means controlled by said weighing mechanism for adjusting said first chart with respect to said first beam to produce said image of the weight designation corresponding to the weight of the material on the scale, means for selectively adjusting said second chart with respect to said third beam in accordance with a selected unit price, and means controlled by said adjusting means for shifting said second beam with respect to said first chart to produce said image of the computed value designation corresponding with the selected unit price and the weight of the material.

5. In an optical computing scale having a weighing mechanism, the combination of a first chart having designations of weight and computed values, a second chart having designations of unit prices, a screen on both the customer's and clerk's sides of said scale, a single light source, means for directing a first light beam from said source toward said first chart to produce images of said weight designations on both said screens, means for directing a second light beam from said light source toward said first chart to project images of said computed value designations on both said screens, means for directing a third light beam from said source toward said second chart to project images of said unit price designations on both said screens, means controlled by said weighing mechanism for adjusting said first chart with respect to said first beam to produce said images of the weight designation corresponding to the weight of the material on the scale, means for selectively adjusting said second chart with respect to said third beam in accordance with a selected unit price, and means controlled by said adjusting means for shifting said second beam with respect to said first chart to produce said images of the computed value designation corresponding with the selected unit price and the weight of the material.

6. In an optical computing scale having a weighing mechanism, a screen, chart means having thereon a plurality of sets of designations, means forming a plurality of light beams for projecting images of said sets of designations onto said screen in relatively closely spaced relation and with the image of each said designation appearing at the same location on said screen respectively, means for shifting one of said beams with respect to said chart means said shifting means including light projecting means located along the path of travel of said one beam from said chart means to said screen and movable in the direction of travel of the portion of said beam projected thereby with resulting variation of the distance of travel of said beam from said chart means to said screen and the width of said beam at said screen, adjustable baffle means located in the path of said one beam from said projecting means to said screen for controlling the width of the portion of said one beam reaching said screen, and means responsive to the operation of said shifting means for adjusting said baffle means to limit the image carried by said one beam to said screen to substantially a single said set of designations for each setting of said shifting means.

7. In an optical computing scale having a weighing mechanism, a screen, chart means having thereon a plurality of sets of designations, means forming a plurality of light beams for projecting images of said sets of designations onto said screen in relatively closely spaced relation, means for shifting one of said beams with respect to said chart means in accordance with a selected one of said designations and thereby varying the distance of travel of said beam from said chart means to said screen, a baffle including a pair of spaced shield members forming a slit therebetween for the passage of said one beam, means mounting said baffle for rotation in the path of said one beam from said chart means to said screen about an axis located substantially centrally of said slit and extending longitudinally of said slit to vary the effective width of said slit with respect to said beam, and means responsive to the operation of said shifting means for effecting rotation of said baffle to limit the image carried by said one beam to said screen to substantially a single said set of designations for each setting of said shifting means.

8. In an optical computing scale having a weighing mechanism, a screen, chart means having thereon a plurality of sets of designations, means forming a plurality of light beams for projecting images of said sets of designations onto said screen in relatively closely spaced relation and with the image of each said designation appearing at the same location on said screen respectively, means including a rotatable shaft for shifting one of said beams with respect to said chart means said shifting means including light projecting means located along the path of travel of said one beam from said chart means to said screen and movable in the direction of travel of the portion of said beam projected thereby with resulting variation of the distance of travel of said one beam from said chart means to said screen and the effective width of said beam at said screen, an adjustable baffle member located in the path of said beam from said projecting means to said screen and forming a slit for limiting the portion of said one beam reaching said screen, means for adjusting said baffle member to vary the effective width of said slit in accordance with said distance of travel of said beam, and means forming an operative connection between said shaft and said varying means for adjusting said baffle in accordance with the setting of said shifting means to limit the image carried by said one beam to said screen to substantially a single said set of designations for each setting of said shifting means.

9. In an optical scale including a frame and a weighing mechanism, the combination of a lever movable in response to movement of said weighing mechanism, a screen, a chart containing computed value designations arranged thereon in parallel columns each corresponding with a different unit price, means for projecting a light beam through said chart to form an image of said designations on said screen, means for shifting said projecting means in a predetermined direction parallel with said chart to direct said beam through a predetermined said column in accordance with a selected unit price, means guiding said chart for movement with respect to said light beam in a direction perpendicular with said direction of shifting of said projecting means, a support for said chart, a roller, pivot means for said roller carried by said lever for movement therewith in response to weighing movement of said lever, and a flexible member looped about said roller and secured at one end to said frame and at its other end to said support to carry said support and said chart for movement relative to said frame in response to movement of said lever and through a distance proportionally greater than the travel of said lever to shift said chart with respect to said light beam in accordance with the weight of the material being weighed.

References Cited in the file of this patent

UNITED STATES PATENTS

| | | |
|---|---|---|
| 837,084 | Von Der Lippe | Mar. 27, 1906 |
| 959,770 | MacDonald | May 31, 1910 |
| 1,105,806 | Longstreth | Aug. 4, 1914 |
| 1,357,731 | Schaper | Nov. 2, 1920 |
| 1,487,514 | Goss | Mar. 18, 1924 |
| 1,491,374 | Babson | Apr. 22, 1924 |
| 1,721,398 | Jacob | July 16, 1929 |
| 1,749,612 | Scott | Mar. 4, 1930 |
| 1,799,817 | Hopkins | Apr. 7, 1931 |
| 1,800,903 | Ramsey | Apr. 14, 1931 |
| 1,806,850 | Giese | May 26, 1931 |
| 1,830,050 | Carroll | Nov. 3, 1931 |
| 1,856,411 | Carroll | May 3, 1932 |
| 1,876,840 | Bissell | Sept. 13, 1932 |
| 1,880,415 | Carroll | Oct. 4, 1932 |
| 1,882,774 | Carroll | Oct. 18, 1932 |
| 1,946,570 | Beidler | Feb. 13, 1934 |
| 2,117,847 | King | May 17, 1938 |
| 2,193,167 | Farwell | Mar. 12, 1940 |
| 2,195,782 | Perritt | Apr. 2, 1940 |
| 2,254,053 | Timson | Aug. 26, 1941 |
| 2,541,365 | Kaufman | Feb. 13, 1951 |

FOREIGN PATENTS

| | | |
|---|---|---|
| 646,426 | Germany | June 15, 1937 |